(12) United States Patent
Frey

(10) Patent No.: US 10,914,397 B2
(45) Date of Patent: Feb. 9, 2021

(54) SELF ALIGNING AND SELF LATCHING MECHANICAL SHAFT CONNECTOR

(71) Applicant: SCHNEIDER ELECTRIC BUILDINGS, LLC, Palatine, IL (US)

(72) Inventor: Brian Frey, Winnebago, IL (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 177 days.

(21) Appl. No.: 15/783,067

(22) Filed: Oct. 13, 2017

(65) Prior Publication Data

US 2018/0106392 A1 Apr. 19, 2018

Related U.S. Application Data

(60) Provisional application No. 62/408,483, filed on Oct. 14, 2016.

(51) Int. Cl.
| | |
|---|---|
| *F16B 21/00* | (2006.01) |
| *F16K 31/44* | (2006.01) |
| *F16B 21/18* | (2006.01) |
| *F16K 27/08* | (2006.01) |
| *F16D 1/10* | (2006.01) |
| *F16K 31/00* | (2006.01) |

(52) U.S. Cl.
CPC ............ *F16K 31/44* (2013.01); *F16B 21/186* (2013.01); *F16D 1/10* (2013.01); *F16K 27/08* (2013.01); *F16K 31/00* (2013.01)

(58) Field of Classification Search
CPC ........ F16D 1/10; F16B 21/186; F16B 21/125; F16B 7/025; Y10T 403/587; Y10T 403/7073; F16K 27/08; F16K 31/00; F16K 31/44

USPC ................................................. 251/291, 292
See application file for complete search history.

(56) References Cited

U.S. PATENT DOCUMENTS

| | | | | |
|---|---|---|---|---|
| 3,032,229 A | * | 5/1962 | Schoepe ................. | F16B 21/10 220/4.01 |
| 3,398,864 A | * | 8/1968 | Kolodziej ............ | B65D 83/262 222/180 |
| 3,687,415 A | | 8/1972 | Turkot | |
| 4,352,586 A | * | 10/1982 | Hayden ..................... | B60S 1/24 285/305 |
| 4,712,708 A | * | 12/1987 | Taguchi ................ | F16B 21/186 137/382 |
| 4,805,870 A | * | 2/1989 | Mertz .................. | F16K 31/0655 251/129.15 |

(Continued)

OTHER PUBLICATIONS

Extended European Search Report from corresponding European Application No. 17196329.1 dated Feb. 23, 2018.

*Primary Examiner* — Matthew R McMahon
(74) *Attorney, Agent, or Firm* — Lando & Anastasi, LLP

(57) ABSTRACT

According to one aspect, embodiments of the invention provide a self-aligning connector system for connecting an actuator to a valve body of a valve, comprising an actuator adapter plug having a conical protrusion and a peripheral groove formed in an outer surface of the actuator adapter plug, and a valve adapter sub-assembly comprising an outer housing having a bore configured to receive the actuator adapter plug, and an expansion spring coupled to the outer housing and configured to provide radial pressure on the outer housing to receive the conical protrusion of the actuator adapter plug and latch onto the peripheral groove.

19 Claims, 4 Drawing Sheets

(56) References Cited

U.S. PATENT DOCUMENTS

| | | | |
|---|---|---|---|
| 5,505,661 A | 4/1996 | Habicht | |
| 5,518,332 A * | 5/1996 | Katoh | F16B 21/16 285/305 |
| 6,684,901 B1 * | 2/2004 | Cahill | F16K 31/0655 137/15.18 |
| 6,886,805 B2 * | 5/2005 | McCarty | F16B 7/0426 251/214 |
| 6,935,615 B2 * | 8/2005 | McCarty | F16B 7/0426 251/214 |
| 6,955,512 B2 * | 10/2005 | Allen | F16B 21/186 211/26 |
| 7,704,008 B2 * | 4/2010 | Shinozaki | F16B 21/186 24/567 |
| 8,132,784 B2 * | 3/2012 | Ferrero | F16K 31/041 251/214 |
| 8,602,385 B2 * | 12/2013 | Evertz | F16K 31/05 251/291 |
| 8,632,054 B2 * | 1/2014 | Carlson | F16K 31/043 251/128 |
| 8,789,807 B2 * | 7/2014 | Kreuter | F16K 31/041 251/291 |
| 9,341,270 B2 * | 5/2016 | Boretti | F16K 27/02 |
| 9,541,212 B2 * | 1/2017 | Rogers | F16K 31/04 |
| 9,791,061 B2 * | 10/2017 | Pippel | F16K 27/003 |
| 10,054,166 B2 * | 8/2018 | Bakken | F16D 1/02 |
| 2002/0030171 A1 * | 3/2002 | Ishigaki | F16K 51/02 251/291 |
| 2010/0011548 A1 * | 1/2010 | Rudduck | B62D 27/00 24/604 |
| 2012/0068099 A1 * | 3/2012 | Sealy | F16K 31/055 251/291 |
| 2016/0025227 A1 | 1/2016 | Boretti | |
| 2016/0053897 A1 * | 2/2016 | Rogers | F16K 31/04 137/15.23 |
| 2018/0003240 A1 * | 1/2018 | Sugiyama | B25B 27/205 |

* cited by examiner

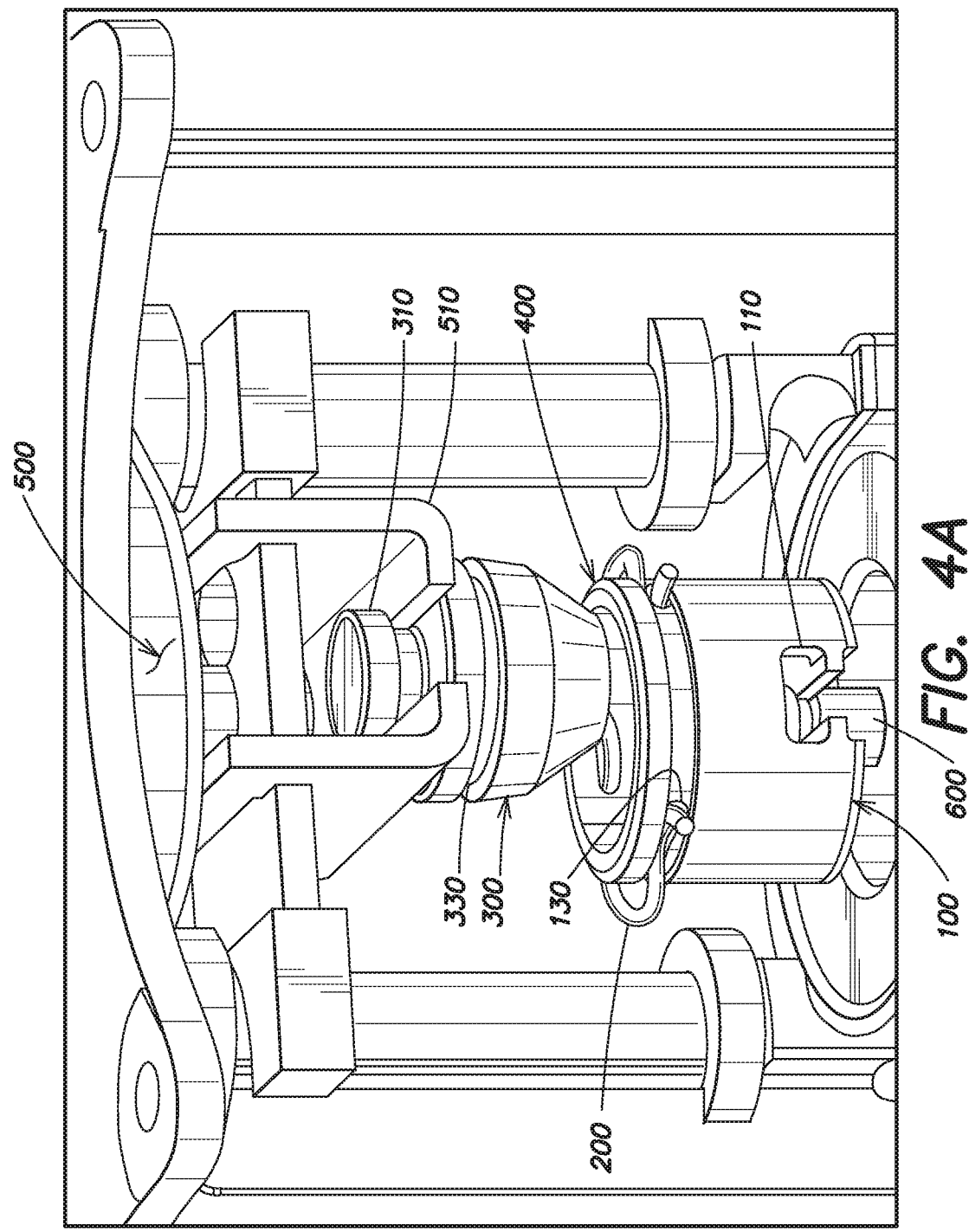

SELF ALIGNING AND SELF LATCHING MECHANICAL SHAFT CONNECTOR

CROSS-REFERENCE TO RELATED APPLICATIONS

This application claims priority to U.S. Provisional Patent Application No. 62/408,483 filed Oct. 14, 2016, entitled SELF ALIGNING AND SELF LATCHING MECHANICAL SHAFT CONNECTOR, which is incorporated by reference herein in its entirety.

BACKGROUND

Field of Invention

Embodiments of the present invention relate generally to actuator driven valves, and more particularly to a releasable connection of an actuator to a valve body in a valve apparatus.

Discussion of Related Art

In valve apparatuses having an actuator, it is sometimes desirable to have the actuator be connected to and/or removed from a valve stem of another operating member of a valve.

SUMMARY

According to principles of the present invention, a self-aligning and self-latching mechanical shaft connector may be used to connect an actuator to a valve body of a valve. In at least one embodiment, the shaft connector has an actuator adapter plug and a valve adapter sub-assembly. The actuator adapter can have a connector mechanism for engaging with an actuator and can have a conical protrusion opposite the connector mechanism and a peripheral groove along the actuator adapter plug body. The valve adapter sub-assembly can include an outer housing having a recessed receptacle for receiving a protrusion from a valve body and a bore for receiving the actuator adapter plug, and an expansion spring placed within the outer housing. The expansion spring can provide radial pressure toward the axis of the outer housing to receive the conical protrusion and latch onto the peripheral groove of the actuator adapter plug.

Aspects in accord with the present invention are directed to a self-aligning connector system for connecting an actuator to a valve body of a valve, comprising an actuator adapter plug having a conical protrusion and a peripheral groove formed in an outer surface 325 of the actuator adapter plug, and a valve adapter sub-assembly comprising an outer housing having a bore configured to receive the actuator adapter plug, and an expansion spring coupled to the outer housing and configured to provide radial pressure on the outer housing to receive the conical protrusion of the actuator adapter plug and latch onto the peripheral groove.

According to one embodiment, the conical protrusion is configured to interface with the outer housing to self-align the actuator adaptor plug and compensate for axis offset errors when the actuator adaptor plug is inserted into the bore. In another embodiment, the conical protrusion is configured to expand the expansion spring as the actuator plug is inserted into the bore. In one embodiment, the expansion spring comprises at least one protrusion configured to engage with the peripheral groove.

According to another embodiment, the actuator adapter plug further comprises a connector mechanism configured to engage with the actuator. In one embodiment, the connector mechanism is further configured to engage with at least one bracket of the actuator. In another embodiment, the connector mechanism is further configured to engage with at least one of an anti-rotation bracket and a u-bracket of the actuator.

According to one embodiment, the outer housing comprises at least one opening configured to allow the at least one protrusion of the expansion spring to protrude into the bore. In another embodiment, the at least one protrusion of the expansion spring includes a plurality of protrusions and the at least one opening of the outer housing includes a plurality of openings. In one embodiment, the plurality of protrusions includes three protrusions.

Another aspect in accord with the present invention is directed to a method for coupling an actuator with a valve body of a valve, the method comprising engaging a connector mechanism of an actuator adapter plug with the actuator, inserting a conical protrusion of the actuator adapter plug into a bore of a valve adapter sub-assembly coupled to the valve body, providing radial pressure toward an axis of the valve adapter sub-assembly as the conical protrusion is inserted into the bore, and latching the actuator adapter plug to the valve adapter subassembly using an expansion spring of the valve adapter sub-assembly that fits into a peripheral groove of the actuator adapter plug.

According to another embodiment, the method further comprises receiving, with a recessed receptacle of the valve adapter sub-assembly, a protrusion from the valve body. In one embodiment, receiving the protrusion from the valve body includes sliding the protrusion from the valve body into the recessed receptacle.

According to one embodiment, engaging the connector mechanism with the actuator comprises sliding the connector mechanism into at least one bracket of the actuator. In another embodiment, inserting the conical protrusion into the bore of the valve adapter sub-assembly comprises self-aligning the actuator adaptor plug to compensate for axis offset errors as the conical protrusion is inserted into the bore. In one embodiment, inserting the conical protrusion into the bore of the valve adapter sub-assembly comprises expanding the expansion spring as the conical protrusion is inserted into the bore.

At least one aspect in accord with the present invention is directed to a valve assembly comprising an actuator, a valve body, an actuator adapter plug configured to be coupled to the actuator, a valve adapter sub-assembly configured to be coupled to the valve body and comprising an outer housing having a bore configured to receive the actuator adapter plug, and means for self-aligning the actuator adapter plug to compensate for axis offset errors when the actuator plus is inserted into the bore and for coupling the valve adapter sub-assembly to the actuator adapter plug.

According to one embodiment, the actuator adapter plug further comprises means for engaging with the actuator. In another embodiment, the valve adapter sub-assembly further comprises means for receiving a protrusion from the valve body.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4A is an isometric view of the valve adapter subassembly mounted on a valve and actuator adapter plug mounted on an actuator in accordance with principles of the invention.

DETAILED DESCRIPTION

Figure 1A:
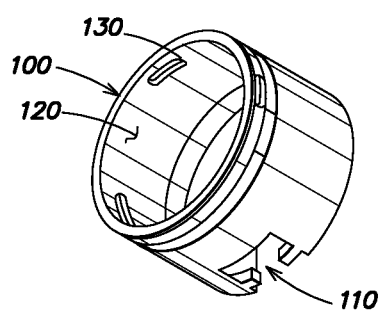
FIG. 1A is an isometric view of an outer housing of a valve adapter sub-assembly in accordance with principles of the invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, in valve apparatuses, it is sometimes desirable to have the actuator be connected to and/or removed from a valve stein of another operating member of a valve. In some valve systems, releasable engagement between an actuator to a valve body may involve manually connecting a valve, having an operating member extending outwardly from the valve body along an axis of the operating member, to an actuator. For example, the actuator can include a latching mechanism to which the operating member of the valve engages and the operating member often includes a "notch" or "protrusion" that is on a plane perpendicular to the axis of the operating member. The latching mechanism of the actuator can have a planar surface that interfaces with a surface of the notch or protrusion to help secure the actuator to the valve body. To engage the notch or protrusion of the valve with the planar surface of the latching mechanism of the actuator, the valve and the actuator must typically be misaligned to insert the valve with the latching mechanism, and then realigned, which can be a difficult and time-consuming process. Such a process may also involve the use of additional tools.

A valve apparatus is provided where the actuator can be operatively connected to a valve stem of another operating member of a valve by a selectively releasable engagement apparatus, such that the actuator can be readily removed from or attached to the valve without the use of additional tools.

Figure 1B:
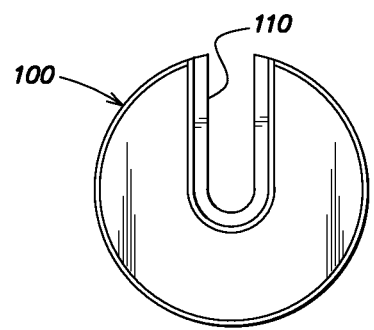
FIG. 1B is a bottom view of the outer housing of FIG. 1A in accordance with principles of the invention.
Figure 1C:
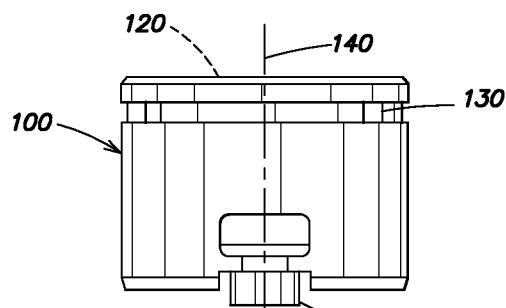
FIG. 1C is a cross sectional side view of the outer housing of FIG. 1A engaged with a valve in accordance with principles of the invention.
Figure 2:
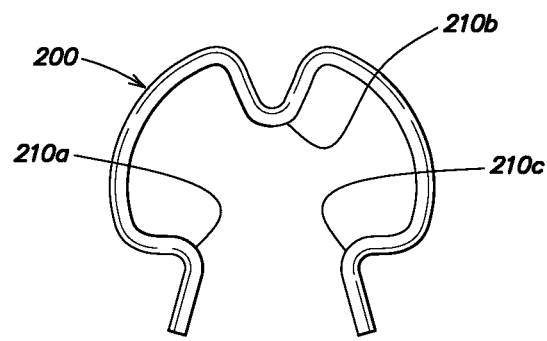
FIG. 2 is a top view of an expansion spring that may be used in connection with the outer housing of FIG. 1A.

FIGS. 1A-C show an exemplary embodiment of an outer housing 100 of a valve adapter sub-assembly in accordance with principles described herein. The outer housing 100 has a recessed receptacle 110. As show in FIG. 1C, the receptacle 110 allows the outer housing 100 to receive a protrusion 600 from a valve body. The outer housing also includes a bore 120 for receiving the actuator adapter plug 300 of FIGS. 3A-C. An expansion spring 200 (shown in FIG. 2) may be placed within the outer housing 100, the expansion spring providing radial pressure on outer housing (e.g., toward the axis 140). In at least one embodiment, expansion spring 200 has three protrusions 210a-c that fit within openings 130 to protrude into the outer housing bore; however, in other embodiments, the expansion spring 200 can include any number of protrusions.

Figure 3A:
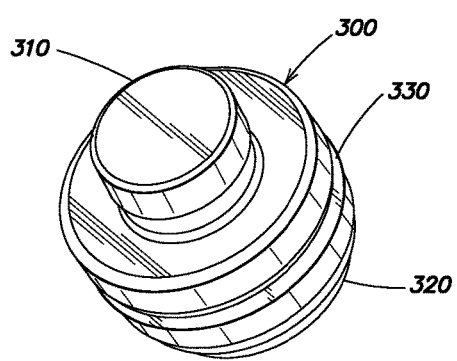
FIG. 3A is an isometric view of an actuator adapter plug of an actuator in accordance with principles of the invention.
Figure 3B:
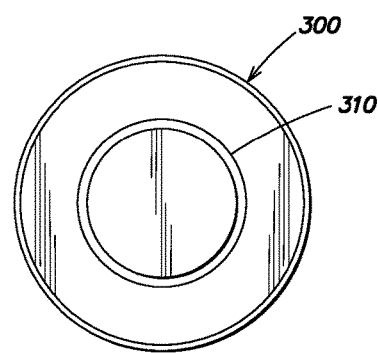
FIG. 3B is a top view of the plug of FIG. 3A.
Figure 3C:
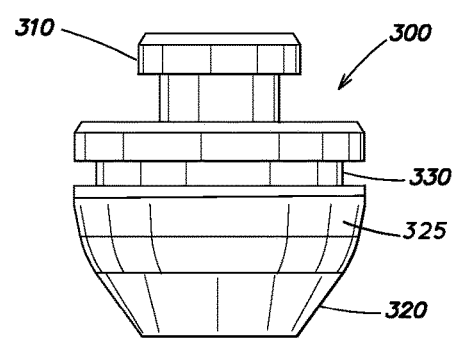
FIG. 3C is a side view of the plug of FIG. 3A.

FIGS. 3A-C show an exemplary actuator adapter plug 300 for an actuator in accordance with principles described herein. The actuator adapter plug 300 has a connector mechanism 310 for engaging with an actuator. In the embodiment shown, connector mechanism 310 engages with two upper brackets (anti-rotation and u-brackets) of an actuator. The actuator adapter plug 300 also includes a conical protrusion 320 opposite the connector mechanism 310, and a peripheral groove 330 along an outer surface of the actuator adapter plug 300.

FIG. 4A shows an isometric view of a valve adapter subassembly 400 having the outer housing 100 and expansion spring 200 mounted on a valve protrusion 600 of a valve. Actuator adapter plug 300 is mounted on an actuator 500 having two upper brackets 510 (called anti-rotation and u-brackets). Typically, in conventional systems, the valve protrusion 600 would engage directly with the brackets 510. In doing so, the connection would involve engaging the notch or protrusion 600 of the valve with the planar surface of the latching mechanism 500 of the actuator. In such a system, the valve and the actuator must typically be misaligned from a common axis to insert the valve with the latching mechanism, and then realigned, which can be a difficult and time consuming process.

In accordance with principles described herein, the actuator adapter plug 300 slides onto the actuator 500. The valve adapter sub-assembly 400 has the outer housing 100 that retains the expansion spring 200 and slides onto the valve protrusion 600. The actuator 500 is driven down to the valve protrusion 600 until the top adapter 300 engages the bottom adapter 400 and the spring 200 is fully latched. Once engaged the geometry of the mated parts and the corresponding shafts prevents the disengagement of the adapters from each other and from the corresponding shafts. This reduces time and effort required to make a connection. No physical tools are required to engage or disengage the connection.

The conical plug geometry of the actuator adapter plug 300 interfacing with the outer housing 100 bore 120 allows the design to self-align and compensate for axis offset errors in any direction perpendicular to the shaft axes. Conical plug geometry also expands the spring 200 as shafts are brought closer together during assembly. The spring 200 then snaps into inner plug groove 330 and creates the final complete connection when the shafts are the correct distance apart.

Figure 4B:
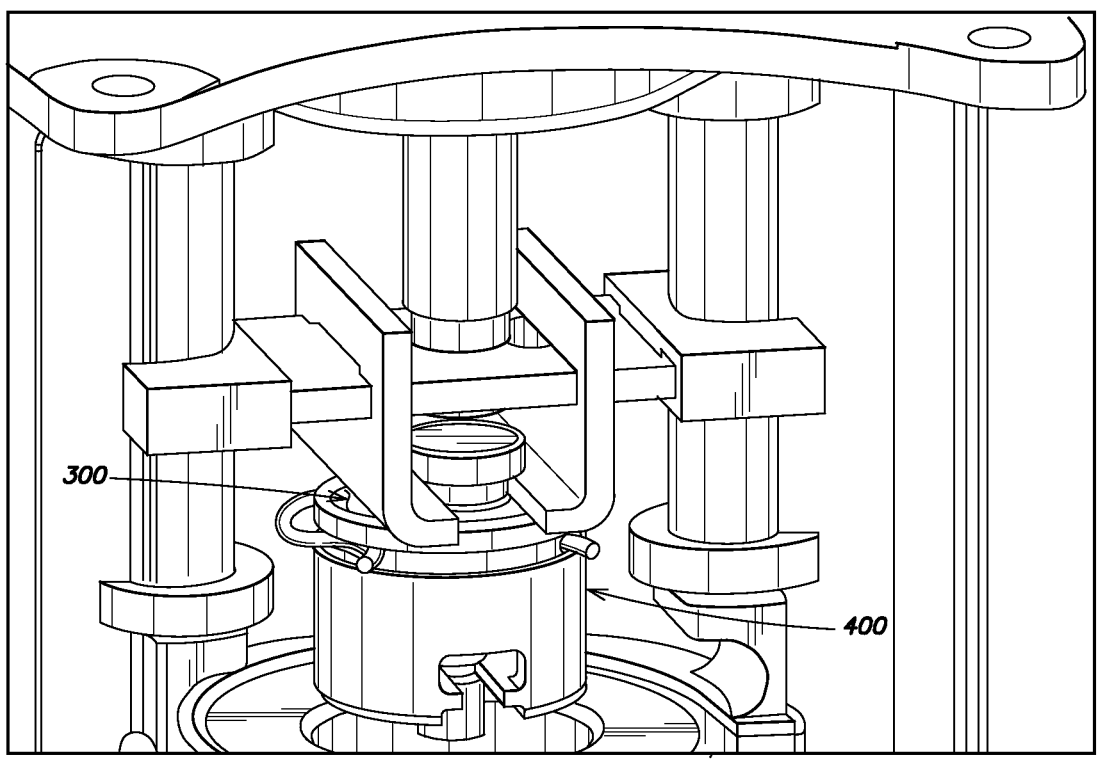
FIG. 4B is an isometric view of the mounted valve adapter subassembly shown in FIG. 4A engaged with the mounted actuator adapter plug in accordance with principles of the invention.

FIG. 4B shows the mounted valve adapter subassembly 400 engaged with the mounted actuator adapter plug 300 in accordance with principles of the invention.

Having thus described several aspects of at least one embodiment of this invention in considerable detail with reference to certain preferred version thereof, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. Further, the phraseology and terminology used herein is for the purpose of descriptions and should not be regarded as limiting. The use of "including," "comprising," "having," "containing," "involving," and variations herein, are meant to be open-ended, i.e. "including but not limited to."

What is claimed is:

1. A self-aligning connector system for connecting an actuator to a valve body of a valve, comprising:
   an actuator adapter plug having a conical protrusion and a peripheral groove formed in an outer surface of the actuator adapter plug, the actuator adapter plug configured to be removably coupled to the actuator; and
   a valve adapter sub-assembly configured to be coupled to a valve protrusion of the valve body, the valve adapter sub-assembly comprising an outer housing having a bore configured to receive the actuator adapter plug subsequent to the valve adapter sub-assembly being coupled to the valve protrusion, and an expansion spring coupled to the outer housing and configured to provide radial pressure on the outer housing to receive the conical protrusion of the actuator adapter plug and latch onto the peripheral groove,
   wherein the conical protrusion is configured to interface with the outer housing to self-align the actuator adaptor plug and compensate for axis offset errors when the actuator adaptor plug is inserted into the bore.

2. The self-aligning connector system of claim 1, wherein the conical protrusion is further configured to expand the expansion spring as the actuator adapter plug is inserted into the bore.

3. The self-aligning connector system of claim 1, wherein the actuator adapter plug further comprises a connector mechanism configured to engage with the actuator.

4. The self-aligning connector system of claim 3, wherein the connector mechanism is further configured to engage with at least one bracket of the actuator.

5. The self-aligning connector system of claim 4, wherein the connector mechanism is further configured to engage with at least one of an anti-rotation bracket and a u-bracket of the actuator.

6. The self-aligning connector system of claim 1, wherein the valve adapter sub-assembly further comprises a recessed receptacle for receiving the valve protrusion of the valve body.

7. The self-aligning connector system of claim 1, wherein the expansion spring comprises at least one protrusion configured to engage with the peripheral groove.

8. The self-aligning connector system of claim 7, wherein the outer housing comprises at least one opening configured to allow the at least one protrusion of the expansion spring to protrude into the bore.

9. The self-aligning connector system of claim 8, wherein the at least one protrusion of the expansion spring includes a plurality of protrusions and the at least one opening of the outer housing includes a plurality of openings.

10. The self-aligning connector system of claim 9, wherein the plurality of protrusions includes three protrusions.

11. A method for coupling an actuator with a valve body of a valve, the method comprising:
    removably coupling a connector mechanism of an actuator adapter plug the actuator;
    coupling a valve adapter sub-assembly to a valve protrusion of the valve body;
    subsequent to coupling the valve adapter sub-assembly to the valve protrusion, inserting a conical protrusion of the actuator adapter plug into a bore of the valve adapter sub-assembly coupled to the valve body;
    providing radial pressure toward an axis of the valve adapter sub-assembly as the conical protrusion is inserted into the bore; and
    latching the actuator adapter plug to the valve adapter subassembly using an expansion spring of the valve adapter sub-assembly that fits into a peripheral groove of the actuator adapter plug,
    wherein inserting the conical protrusion into the bore of the valve adapter sub-assembly comprises self-aligning the actuator adaptor plug to compensate for axis offset errors as the conical protrusion is inserted into the bore.

12. The method of claim 11, wherein removably coupling the connector mechanism to the actuator comprises sliding the connector mechanism into at least one bracket of the actuator.

13. The method of claim 11, wherein coupling the valve adapter sub-assembly to the valve protrusion of the valve body comprises receiving, with a recessed receptacle of the valve adapter sub-assembly, the valve protrusion of the valve body.

14. The method of claim 13, wherein receiving the valve protrusion of the valve body includes sliding the protrusion of the valve body into the recessed receptacle.

15. The method of claim 11, wherein inserting the conical protrusion into the bore of the valve adapter sub-assembly comprises expanding the expansion spring as the conical protrusion is inserted into the bore.

16. A valve assembly comprising:
    an actuator;
    a valve body;
    an actuator adapter plug configured to be removably coupled to the actuator;
    a valve adapter sub-assembly configured to be coupled to a valve protrusion of the valve body, the valve-adapter sub-assembly comprising an outer housing having a bore configured to receive the actuator adapter plug subsequent to the valve adapter sub-assembly being coupled to the valve protrusion; and the actuator adapter plug including means for self-aligning the actuator adapter plug to compensate for axis offset errors when the actuator adapter plug is inserted into the bore and for coupling the valve adapter sub-assembly to the actuator adapter plug.

17. The valve assembly of claim 16, wherein the actuator adapter plug further comprises means for engaging with the actuator.

18. The valve assembly of claim 17, wherein the means for engaging with the actuator is opposite the means for self-aligning the actuator adapter plug.

19. The valve assembly of claim 16, wherein the valve adapter sub-assembly further comprises means for receiving the protrusion of the valve body.

* * * * *